June 8, 1965  R. K. BROWN  3,187,890
PROJECTOR SLIDE TRAY
Original Filed July 3, 1959  2 Sheets-Sheet 2
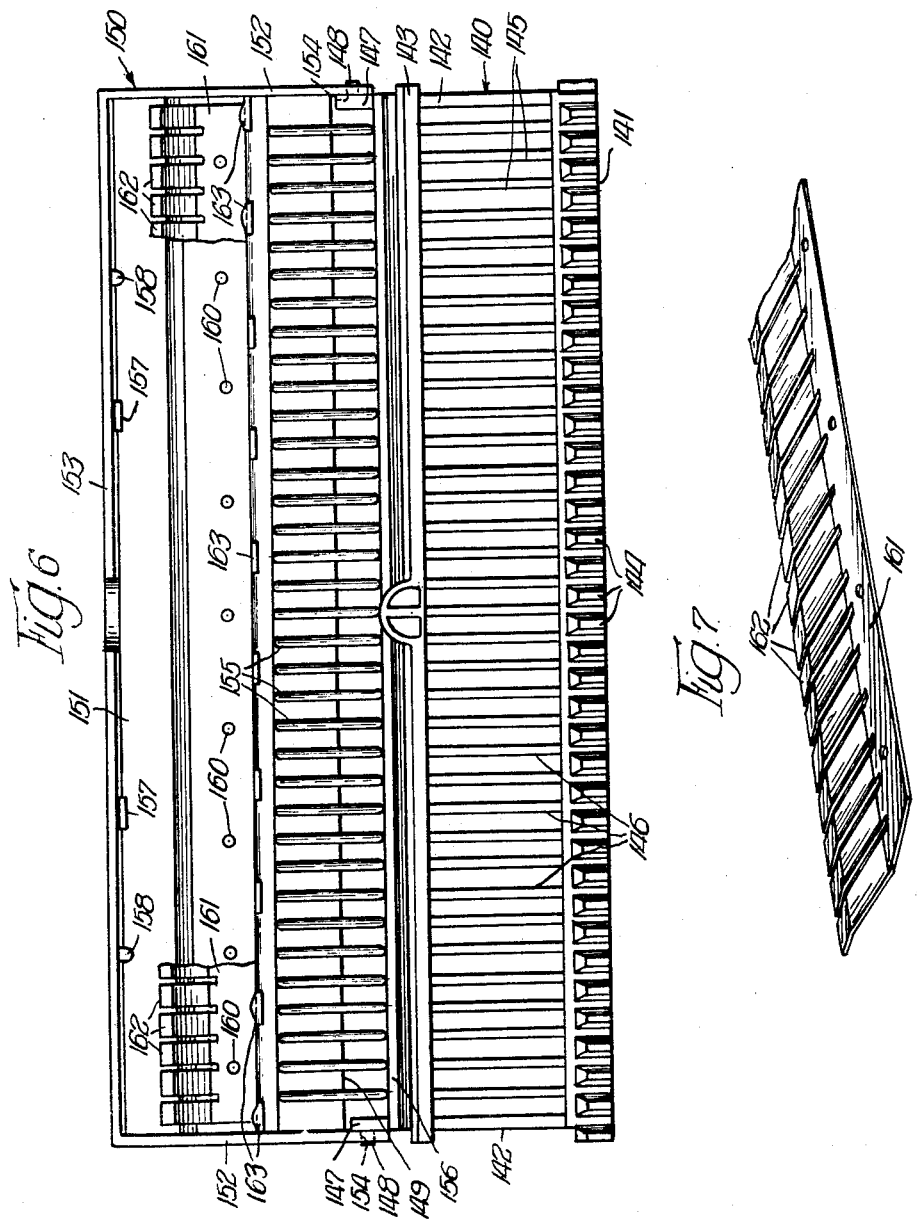
INVENTOR.
Robert Keith Brown,
BY
Greist, Lockwood, Greenawalt & Dewey
ATTYS

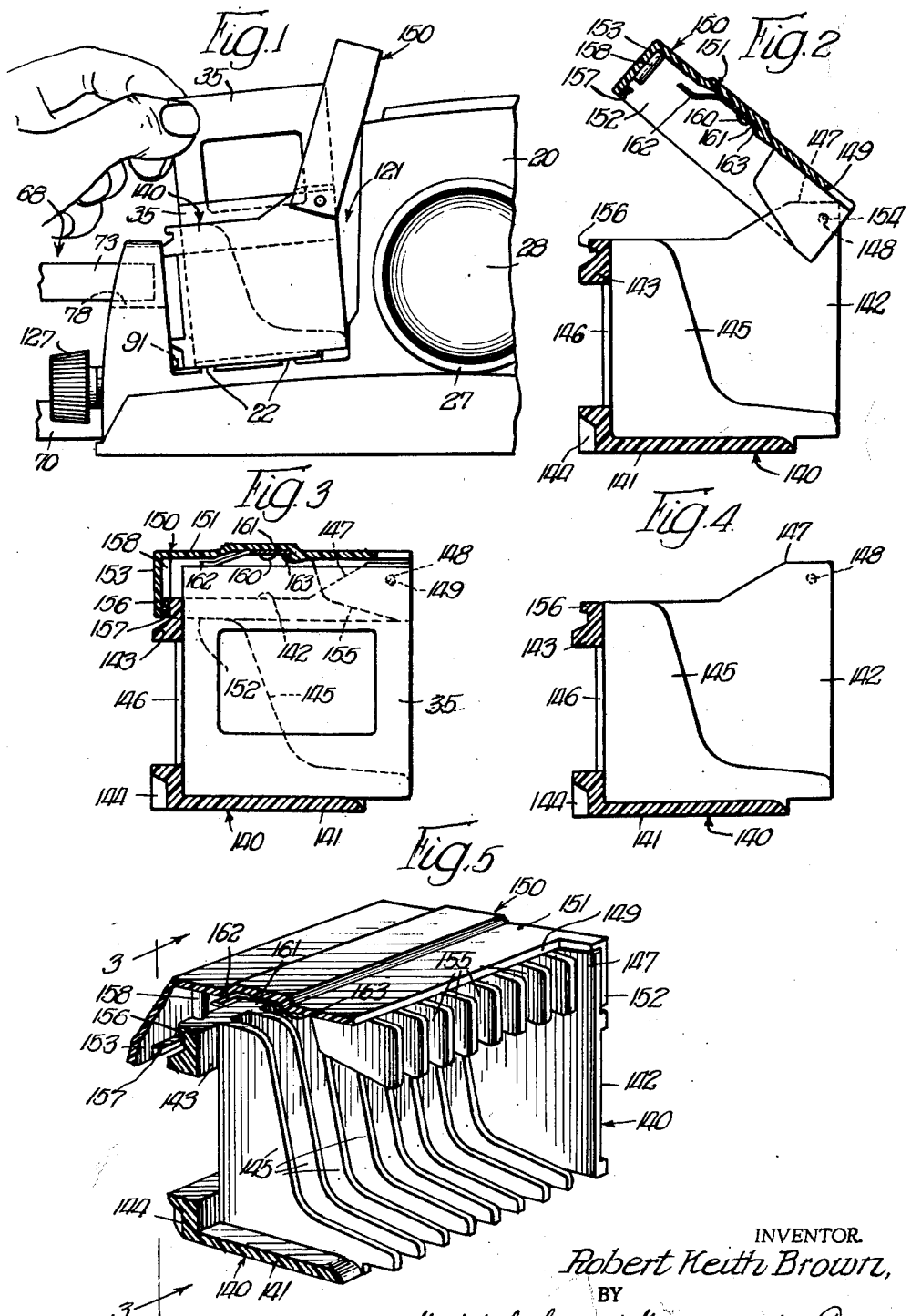

United States Patent Office 3,187,890
Patented June 8, 1965

3,187,890
PROJECTOR SLIDE TRAY
Robert Keith Brown, Chicago, Ill., assignor, by mesne assignments, to Sawyers, Inc., Portland, Oreg., a corporation of Oregon
Original application July 3, 1959, Ser. No. 824,877, now Patent No. 3,120,150, dated Feb. 4, 1964. Divided and this application Oct. 22, 1962, Ser. No. 236,756
6 Claims. (Cl. 206—73)

This application is a division of Serial No. 824,877, filed July 3, 1959, now Patent No. 3,120,150.

The present invention relates to a projector for showing mounted slides and transparencies directly and sequentially from a slide tray in which they are normally stored when not being shown and more particularly to a new and improved slide tray for such a projector.

An object of the invention is to provide a new and improved slide tray which permits editing, that is changing or rearranging, of slides in the tray without removing the tray from an open top slide-tray-receiving groove.

It is another important object of the invention to provide a new and improved slide tray for a slide projector of the character described in the aforementioned patent, which tray is provided with a hinged cover to permit editing of the slides while the tray is positioned in the slide-tray-receiving groove of the projector, the hinged cover of the tray being provided with finger-like springs which are engageable with edge portions of the mounted slides to aid in retaining the slides within the tray.

Certain other objects of the invention will, in part, be obvious, and will in part appear hereinafter.

For a more complete understanding of the nature and scope of the invention reference may now be had to the accompanying drawings wherein:

FIG. 1 is a front end elevational view of the projector disclosed in the aforementioned Brown patent but partly broken away and showing a specially designed slide-editing tray having a hinged cover positioned in the slide-tray-receiving groove of the projector with the cover fully opened and showing a mounted slide being positioned in (or removed from) the tray;

FIG. 2 is an enlarged vertical transverse section through the slide tray shown in FIG. 1 with the cover in a partially open position;

FIG. 3 is a vertical section similar to FIG. 2 and taken generally along the plane indicated by the line 3—3 of FIG. 5 showing the cover in its closed position and one of the spring-like fingers carried thereon in engagement with one of the mounted slides;

FIG. 4 is a vertical section similar to FIGS. 2 and 3 but with the hinged cover detached;

FIG. 5 is a perspective view, partly broken away, of the slide tray as shown in FIG. 3 with the cover in its closed position and looking toward the open side of the slide tray;

FIG. 6 is a side elevational view of the slide tray looking toward the opposite side thereof with the cover opened to a genreally vertical position; and FIG. 7 is a perspective view, partly broken away, of the spring retainer which is mounted in the cover of the slide tray.

As shown the Brown patent, the projector includes a housing or casing 20 which is preferably formed of metal and in one piece, as by a casting operation. The casing 20 is provided with a slide-tray-recieving channel or trough-like groove 21 which extends along one side thereof and is open at its top and at the forward and rear ends of the casing 20. Suitable slide rails 22 are provided on the bottom surface of the groove 21.

An adjustable focusing-lens-housing 27 including a focusing lens 28 are disposed in the projector casing 20 in alignment with the optical axis thereof.

The invention is concerned with a specially designed slide-editing tray 140 which is particularly well adapted for use with the slide projector disclosed in Brown patent No. 3,120,150 mentioned above because of the open-topped slide-tray-receixing groove feature thereof. The slide tray 140 is provided with a hinged cover 150 which because of the last-mentioned feature of the projector permits editing of the slides 35 stored therein without removing the slide tray 140 from the slide-tray-receiving groove 21 of the projector. The hinged cover 150 is merely pivoted to its open position (FIGS. 1 and 6), whereby to permit replacing any one of the slides in the tray 140 with another slide or re-arranging the slides in the tray 140. As is clearly illustrated in FIG. 1, the cover 150 may be fully opened when the tray 140 is positioned in the slide-tray-receiving groove 21 of the projector so that mounted slides 35 may be positioned in the tray 140 or removed therefrom through the open top thereof to replace or re-arrange the slides 35 as desired. This slide-editing feature is particularly convenient inasmuch as the slides being edited may readily be transferred into the projector by the slide carrier 68 for proper identification thereof inasmuch as the slide tray 140 may at all times remain in the groove 21. Use of the slide-editing tray 140 for the purpose intended is not possible with projectors in which portions of either the casing or the slide-change mechanism thereof extend across or project into a slide-tray-receiving groove thereof.

As best shown in FIGS. 2–6, the slide-editing tray 140 which may be molded of plastic, is characterized by a bottom wall 141, as viewed in the drawings, a pair of end walls 152, and a side wall 143 is provided with a centrally arranged, longitudinally extending slot for a purpose which will be evident hereinafter. The lower edge of the side wall 143 is provided with a multi-toothed rack 144 which is adapted to be engaged by the indexing gear 91 for forward and rearward indexing of the tray 140 as previously described herein. The side of the tray 140 opposite the longitudinally slotted wall 143 is open to permit slides 35 stored in the tray 140 to be advanced into the projector and returned to the tray 140.

The tray 140 is provided with a plurality of longitudinally spaced partitions of septums 145 which define separate storage areas for each of the slides 35. The septums 145 are generally L-shaped and extend along the bottom wall 141 and the side wall 143 of the tray 140 whereby they are adapted for confining engagement with three of the four corners of the slides 35 disposed therebetween. The portions of the septums 145 which extend along the side wall 143 form with the longitudinal slot therein a plurality of vertically elongated openings 146 through each of which the inner end of the pusher arm 73 may be advanced to transfer a slide 35 from the tray 140 into the projector for viewing. The inner upper corners of the end walls 142, as viewed when the tray 140 is positioned in the slide-tray-receiving groove 121 of the projector, are each provided with a raised portion 147 having an outwardly projecting pivot pin 148 formed on the outer surface thereof for hingedly or pivotably mounting the cover 150 on the tray 140 as will be described.

The cover 150, as best shown in FIGS. 2, 3, 5 and 6 is characterized by a top wall 151 which, when in its closed position on the tray 140, terminates inwardly of the pivot pins 148 at an edge 149, a pair of depending end walls 152 each of which is provided with an opening 154 adapted to receive one of the pivot pins 148, and a depending side wall 153 adapted to extend over the upper portion of the side wall 143 of the tray 140. The cover 150 may be snapped onto the pivot pins 148 by flexing the portions 147 of the end walls 142 of the tray 140 inwardly. A plurality of longitudinally spaced ribs 155 depend from the top wall 151 of the cover 150 and project somewhat beyond the terminating edge 149 thereof. Each of the ribs 155 is aligned with one of the septums 145 whereby the ribs 155 act to confine the fourth corner of each of the slides 35 stored in the tray 140. The depending and projecting ribs 155 on the cover 150 permit the transfer of slides 35 between the tray 140 and the projector when the cover 150 is either in its open or closed positions.

The upper portion of the side wall 143 of the tray 140 is provided with a longitudinally extending latching lip 156, and the inner surface of the side wall 153 of the cover 150 is provided with a plurality of friction lugs 157. Thus, when the cover 150 is pivoted into its closed position (FIGS. 3 and 5), the lugs 157 snap over the latching lip 156 and the cover 150 is retained in its closed position. The inner surface of the side wall 153 of the cover 150 is also provided with a plurality of integral posts 158 which are engageable with the upper edge of the side wall 143 of the tray 140.

It is noted that the hinged connection of the cover 150 is at the projector side of the tray 140 whereby it is most convenient for a person sitting alongside of the projector to have access to the slides 35 for editing purposes. As is evident from a comparison of FIG. 5 of the Brown patent and FIG. 1 herein, the slide-editing tray 140, which almost fills the slide-tray-receiving groove 21, is somewhat wider than the standard or conventional slide tray 36 shown in the Brown patent and thus provides greater guiding control over the slides 35 when they are being transferred between the tray 140 and the projector.

The slides 35 when stored in standard or conventional type trays, such as the tray 36 mentioned above, are somewhat loose and tend to fall out of the tray when it is flipped on its side for positioning in the slide-tray-receiving groove of a projector. The slide-editing tray 140 is provided with a spring retainer which is adapted to prevent the slides 35 from falling out of it. The undersurface of the top wall 151 of the cover 150 is provided with a plurality of centrally arranged, longitudinally spaced mounting pins 160. The spring retainer is formed of an elongated strip 161, or series of strips arranged in end-to-end relationship, of spring metal which is mounted on the pins 160 in any suitable manner. The strip 161 is provided along one edge with a plurality of integral, downwardly biased spring fingers 162 each of which is engageable with the upper edge of one of the mounted slides 35, as shown in FIG. 3, whereby to retain the slides 35 in the tray 140. The undersurface of the top wall 151 of the cover 150 may be provided with a series of projections 163 which are engageable with the other edge of the strip 161 to retain it flush against the top wall 151. When the cover 150 is in its open position, the spring pressure is of course no longer effective and the slides 35 may be readily removed from the tray 140 for editing purposes. The spaces or slots separating the spring fingers 162 are substantially narrower than the thickness of the mounted slides 35 whereby to prevent the slides 35 from becoming jammed therebetween.

The operation of the projector when the slide-editing tray 140 is being used is identical to the operation as described in the aforementioned Brown patent with regard to the standard or conventional tray 36 disclosed therein. The spring pressure acting to retain the slides 35 in the tray 140, when the cover 150 is latched in its closed position, is not sufficient to prevent movement of the slides from the tray 140 by the pusher arm 73. However, if desired, the cover 150 may be unlatched or even pivoted to its open position during operation of the projector to permit completely unrestricted transfer movement of the slides 35 between the tray 140 and the projector.

It will be understood that certain changes may be made in the construction or arrangement of the slide-editing tray which is disclosed herein without departing from the spirit and scope of the invention as defined in the appended claims.

I claim:

1. A slide tray comprising, a bottom wall, a pair of end walls, a side wall having a centrally arranged, longitudinally extending slot formed therein, a plurality of longitudinally spaced internal partition members projecting integrally from said bottom and side walls, a cover hingedly mounted on the upper corners of said end walls away from said side wall for movement between open and closed positions, and a plurality of longitudinally spaced ribs depending from said cover at the hinged edge thereof each being in alignment with one of said partition members and projecting between the corners of slides stored between said partitions, the ribs being arranged relative to the pivot axis of the cover so that the ribs remain in projecting relation between the corners of slides during movement of the cover between its opened and closed positions, whereby all four corners of mounted slides stored in the tray are positively separated from each other by said partition members and said ribs associated therewith when the cover is in either its open or closed position or any position therebetween, said cover being pivotable to its open position when the tray is positioned in an open-top slide-tray-receiving groove of a projector to permit editing of the slides stored therein.

2. A slide tray as recited in claim 1 wherein a spring retainer is mounted on the undersurface of said cover, said spring retainer having a plurality of spring fingers biased downwardly for engagement with the upper edge of mounted slides stored in the tray when said cover is closed to resiliently retain the slides in the tray.

3. A slide tray for use in a projector of the type having an open top slide receiving groove, said tray comprising an elongated rectangular-shaped box open at one side thereof and open at its top, a plurality of longitudinally spaced internal partition members in said box defining a plurality of slide receiving spaces, an operable cover closing the open top of said box, said cover having three walls including two opposite end walls and a side wall which engages the side of said box opposite said one side thereof thereby permitting movement of slides into and out of said tray through said one side thereof when said cover closes the top of said box and permitting editing of slides upon opening of said cover.

4. The slide tray according to claim 3 wherein said cover has a spring retainer mounted on the underside thereof, said retainer including a plurality of downwardly biased spring fingers engaging respective upper edges of photographic slides supported between said partition members when the cover closes the top of said box.

5. A projector slide tray comprising, an elongated rectangular-shaped box open at one side thereof to facilitate movement of photographic slides between the tray and a projector and open at the top thereof to permit editing of photographic slides when the tray is in place in a projector, a plurality of L-shaped longitudinally spaced partition members in said box, each of which partition members has one leg thereof disposed along the bottom of said box and the other leg thereof disposed along the side of said box opposite the open side thereof, and an openable cover mounted on said box for pivoting movement between open and closed positions about an axis extending longitudinally of the box, said cover having a plurality of longitudinally spaced ribs depending therefrom, said ribs being in alignment with said partition members and projecting between the corners of the slides stored between said partitions, the ribs being arranged relative to the pivot axis of the cover so that the ribs remain in projecting relation between the corners of the slides during movement of the cover between its open and closed positions, all four corners of the photographic slides stored in the tray being positively separated from each other by said partition members and the ribs associated therewith when the cover is in either its open or closed position or in any position therebetween.

6. A projector slide tray for use with a projector having an open top slide tray receiving groove, said slide tray comprising an elongated rectangular-shaped box open at one side thereof to facilitate movement of photographic slides between the tray and the projector and open at the top thereof to permit editing of photographic slides when the tray is in place in the projector, a plurality of L-shaped longitudinally spaced internal partition members in said box, each partition member having one leg thereof disposed along the bottom of said box and the other leg thereof disposed along the side of said box opposite the open side thereof, and an openable cover mounted on said box for pivoting movement between open and closed positions about an axis extending longitudinally of the box, said cover having a pluarlity of longitudinally spaced ribs depending therefrom, said ribs being in alignment with said partition members and projecting between corners of slide stored between said partition members, the ribs being arranged relative to the pivot axis of the covers so that the ribs remain in projecting relation between the corners of said slides during movement of the cover between its open and closed positions, all four corners of the photographic slides stored in said tray being positively separated from each other by said partition members and the ribs associated therewith when the cover is in either its open or closed position or any position therebetween, said cover having a spring retainer mounted on the underside thereof, said retainer including a plurality of downwardly biased spring fingers engaging the upper edges of photographic slides supported between said partition members when the cover is in its closed position.

References Cited by the Examiner

UNITED STATES PATENTS

| 979,314 | 12/10 | Hall et al. | 312—290 |
| 1,461,336 | 7/23 | Weide | 312—10 |
| 2,589,593 | 3/52 | Anderson et al. | 206—45.13 |
| 2,731,270 | 1/56 | Schulz | 206—45.11 |
| 2,735,542 | 2/56 | Schnitzler | 220—31 |
| 2,774,472 | 12/56 | Badalich | 220—60 |
| 2,808,148 | 10/57 | Kerney | 206—45.13 |
| 2,845,465 | 3/58 | Burgo | 312—10 |
| 2,900,074 | 8/59 | Windman | 206—62 |
| 2,929,530 | 3/60 | Sargent | 220—22 |
| 3,045,816 | 7/62 | Hing | 206—73 |

FOREIGN PATENTS 24,497  1907  Great Britain.

THERON E. CONDON, *Primary Examiner.*

EARLE J. DRUMMOND, *Examiner.*